A. W. GATES.
Car-Ventilators.
No. 147,834. Patented Feb. 24, 1874.
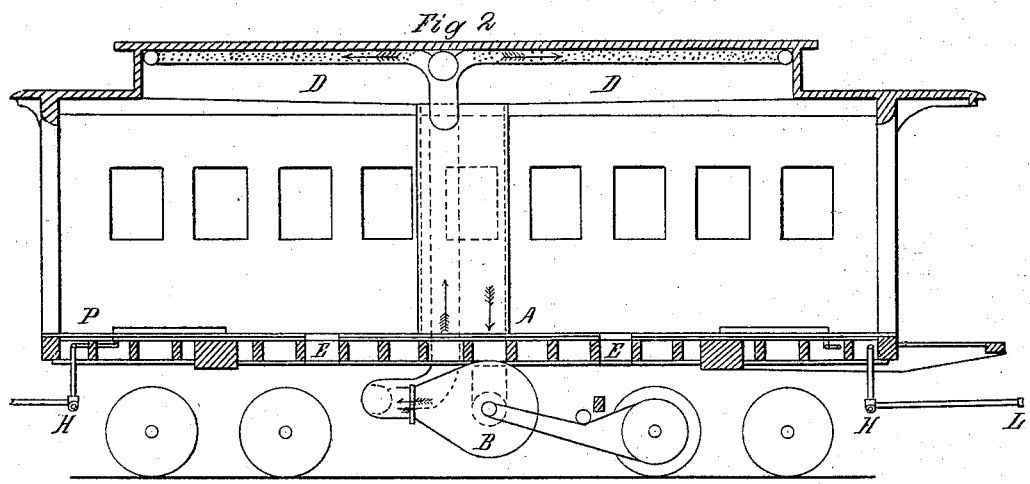
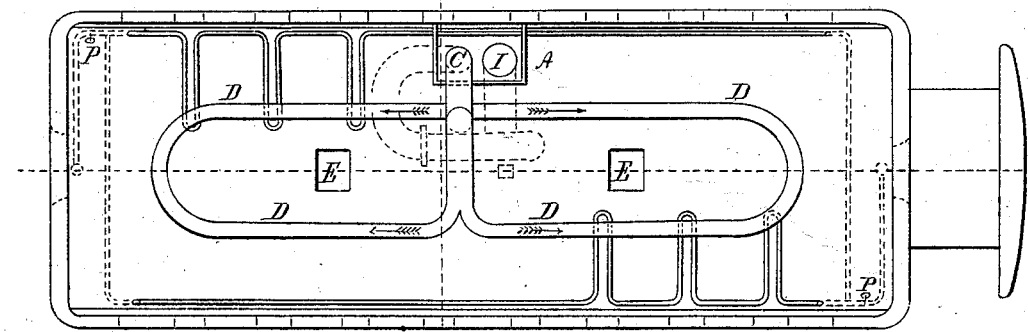
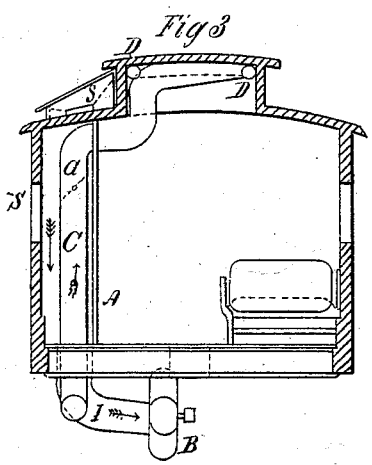
Witnesses.
C. G. Keyes.
L. S. Whipple.
Inventor.
A. W. Gates.

UNITED STATES PATENT OFFICE.

ARTEMAS W. GATES, OF BOSTON, ASSIGNOR OF ONE-HALF HIS RIGHT TO GEORGE O. SANBORN, OF CAMBRIDGE, MASSACHUSETTS.

IMPROVEMENT IN CAR-VENTILATORS.

Specification forming part of Letters Patent No. 147,834, dated February 24, 1874; application filed January 4, 1873.

*To all whom it may concern:*

Be it known that I, ARTEMAS W. GATES, of Boston, in the county of Suffolk and State of Massachusetts, have invented an Arrangement for an Improved System of Ventilating and Heating Railway-Cars, of which the following is a specification:

My invention relates to an improved plan for ventilation, by which abundant and regulated supplies of fresh air are excited, distributed, and passed into and through a car in gentle downward currents, while dust and cinders are excluded, either with or without heat-radiating surfaces.

By reference to the accompanying drawings the description and operation of my apparatus will be understood.

Figure 1 is a plan or top view, with the top of a car removed, exposing distributing air-tubes and radiating steam-pipes. Fig. 2 is a longitudinal section or an elevation, with the side of a car removed. Fig. 3 is a transverse section.

The object of my invention is to cause a uniform and general downward movement of the whole body of air in a car, and to furnish regulated supplies of pure air and heat in a closed car, in such a manner as to establish the highest conditions of health and comfort for passengers and of economy for railroad companies. In the accomplishment of this design, I employ a fan-blower which is actuated from the running-gear of the car, co-operating with perforated distributing-tubes in the top of the car, and exit-openings in the bottom of the car, for causing a positive and regular flow of air through the car in a downward direction; and I use ordinary and well-known means for cleansing and regulating the amount of air discharged into the car, as hereinafter more fully set forth.

Reference being had to attempts heretofore made to ventilate railway-cars, I do not provide for taking air charged with dust and cinders into a car, and then provide for their collection and removal. Any method tending to the accumulation of impurities is objectionable. Large screens cover the outward openings of the air-chamber, and abundant supplies of purified air pass through moderately to feed the blower. The blower is between the screens and the distributing-tubes. The air, in passing through a large number of small orifices, with which the distributing-tubes are supplied, is generally diffused, and loses a portion of the force of the impact given by the blower, and forcible currents within the car are prevented. By the means provided, when the car is in motion a positive and regular downward current is created throughout the car, independent of the force of the currents of air outside the car, and is discharged at the bottom of the car. In connection with the positive and regular downward current is a system of heat-radiating surfaces, causing an upward current, which is counteracted and resisted by the ventilating-currents. The blower, co-operating with the other parts, creates a regular and positive downward current whichever way the car moves. By the action of the fan-blower B, I draw the requisite supply of air into and from an air-chamber, A, through an induction-pipe, I. The air-chamber may be located inside or outside a car, as may be most convenient, but in either case has one or more large openings connecting with the outside air, which openings are covered with fine screens, S, to prevent, as far as practicable, the admission of dust and cinders. I prefer to take the air from the vicinity of the top of the car, as being less charged with fine dust from the road-bed. The blower should be located with reference to being actuated by a belt from a pulley on the axle-tree of one of the trucks. I prefer to place the blower under the car, on a line with the actuating-pulley, parallel with the bottom of the car. As a car runs in either direction, the blower B should be reversible in its action.

My peculiar form of blower, adapting it to the requirements of the case, consists of a fan having straight floats surrounding a shaft, and attached to an annular disk on one side, arranged within a spheroidal case or shell, which is considerably elongated, and converges to the mouth or delivery, so as to form somewhat a bellows shape. The air is received through an aperture on the side opposite the annular disk and around the shaft. The periphery of the case is considerably larger than that of the revolving fan, so that space is afforded for the free delivery of air from the entire circumference of the fan. The construction, as described, allows the centrifugal force by which air is delivered from the circumference of the fan to act uniformly and to deliver equally whichever way the fan is revolved. From the blower the air is driven, in the direction indicated by arrows, through the connecting-tube C and distributing-tubes D. The tubes D should extend nearly or quite the length of the car near the top, and for convenience are generally extended around the monitor part of the car. Throughout the length of these distributing-tubes are a large number of small orifices, emitting the air into the car; and as the supply acccumulates in the top of the car, the whole body of the air is driven downward in modified currents, so gentle as to be well nigh imperceptible to the senses. The power or capacity of the blower should be sufficient to furnish at least two thousand cubic feet of air per minute when the car moves at the average rate of speed. In cold weather a greatly diminished supply will prove sufficient. To regulate the amount of air to meet the varying conditions, I insert in the connecting-tube C an adjustable gage, G, which may be set so as to cut off a portion of, or entirely, the supply of air that would otherwise be driven into the car.

For winter weather I also provide a system of heat-radiating surfaces, distributed through the car near the floor, the effect of which is as follows: Heat-radiating surfaces ordinarily cause currents of heated air to rise to the top of the car, where the heat is largely wasted. The combination of the positive and regular downward ventilating currents counteracts and resists the tendency of the heated air to rise, and so utilizes the heat more perfectly, and causes a genial warmth to be disseminated in the vicinity of the lower extremities, where it is most needed, while the respiratory organs of the passengers are constantly supplied with fresh air. The forms of radiators which I prefer are ordinary iron pipes, extending along the floor, and supplied with steam or other heated substance.

Any system of heat-distributers in the bottom of the car, in combination with the positive and regular downward flow of air, as set forth, may be effective for the purpose. In addition, a coil of pipe or other radiating-surface may be extended into the air-passage leading to the blower or from the blower, so as to attemper the air emitted into the car, as specified, whenever the temperature shall require it. Along the central aisle are exit-openings E in the floor of the car, which are usually guarded by ordinary registers, and which connect with the outside for carrying away the air after it shall have accomplished its purposes.

I claim—

1. The combination of a fan-blower with distributing-pipes, discharging through orifices at the top of the car, and exit-openings in the bottom of the car, all co-operating together for producing within the car a positive and regular downward flow of air, substantially as described.

2. In combination with the specified means of ventilation within the car, a system of heat-distributers arranged in the bottom of the car, and operating substantially as described.

A. W. GATES.

Witnesses:
ZENAS SNOW ARNOLD,
C. G. KEYES.